Aug. 14, 1928.
W. E. STARK ET AL
1,680,647
CAMERA
Original Filed Sept. 18, 1924   3 Sheets-Sheet 1
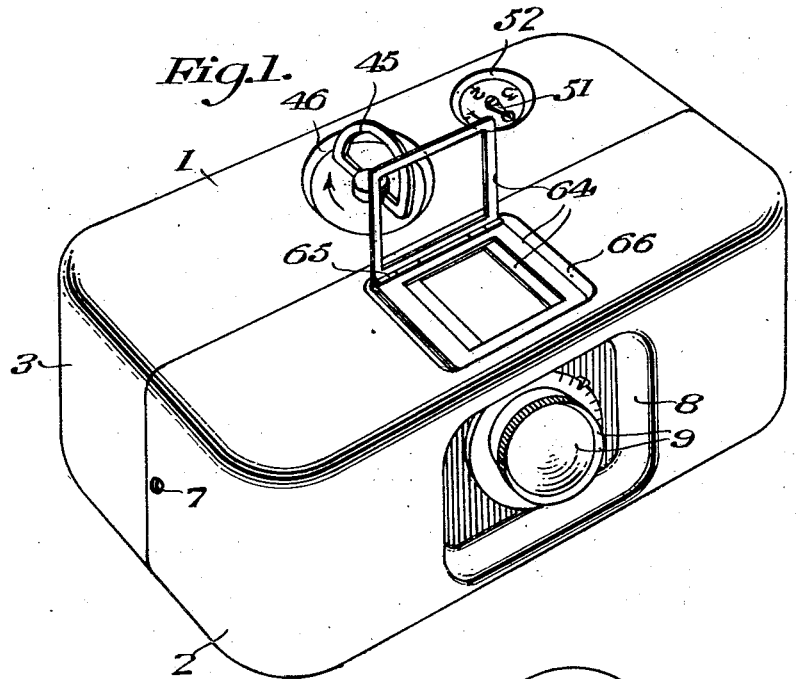
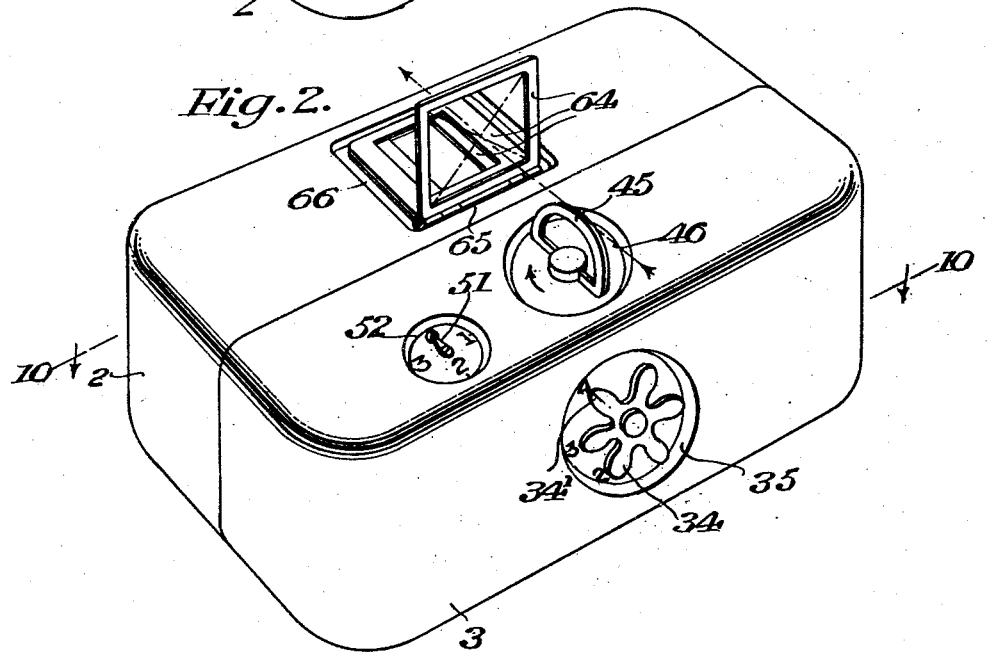
INVENTOR
Walter E. Stark &
Samuel H. Drake.
BY
ATTORNEYS Aug. 14, 1928.
W. E. STARK ET AL
1,680,647
CAMERA
Original Filed Sept. 18, 1924   3 Sheets-Sheet 2
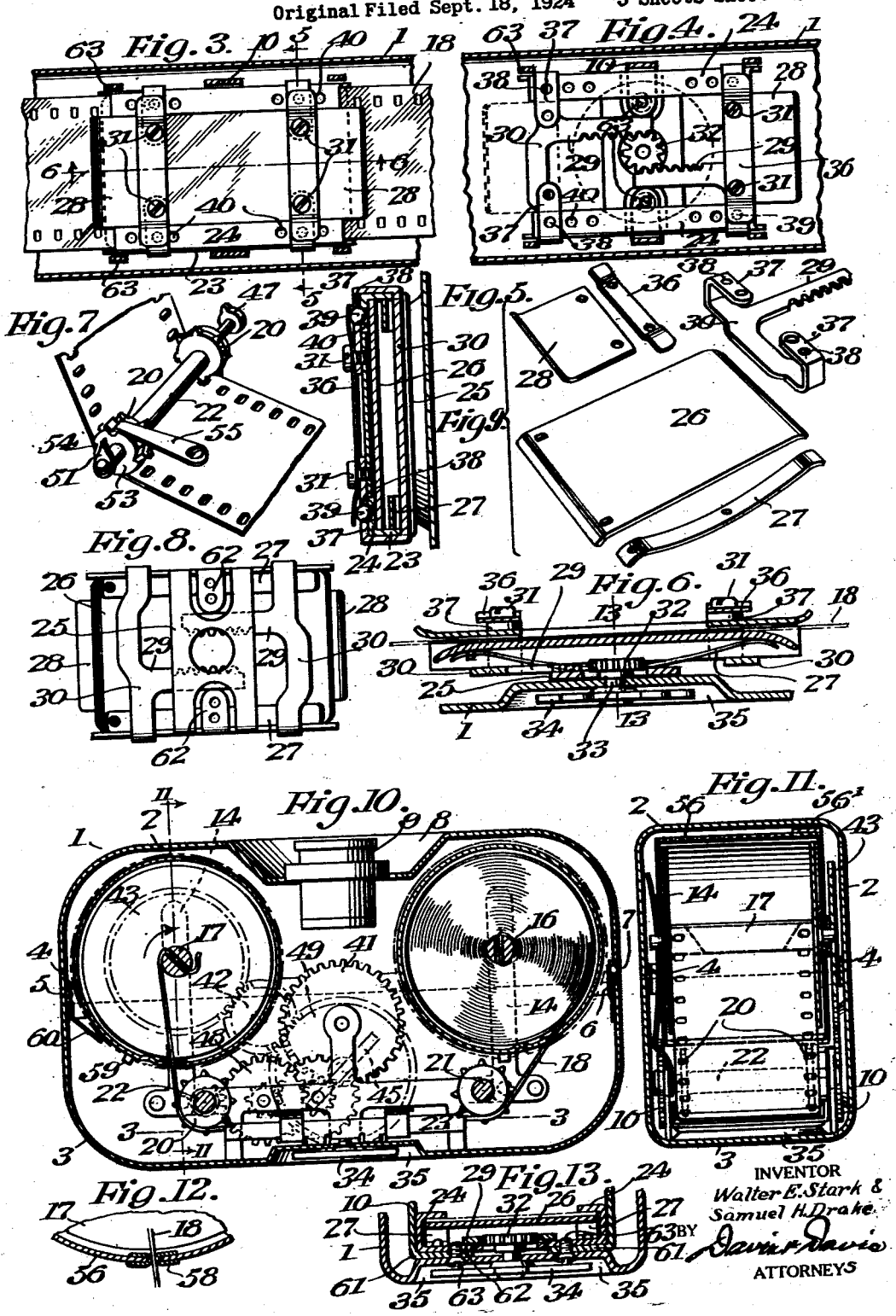
INVENTOR
Walter E. Stark &
Samuel H. Drake
BY
Davis Davis
ATTORNEYS

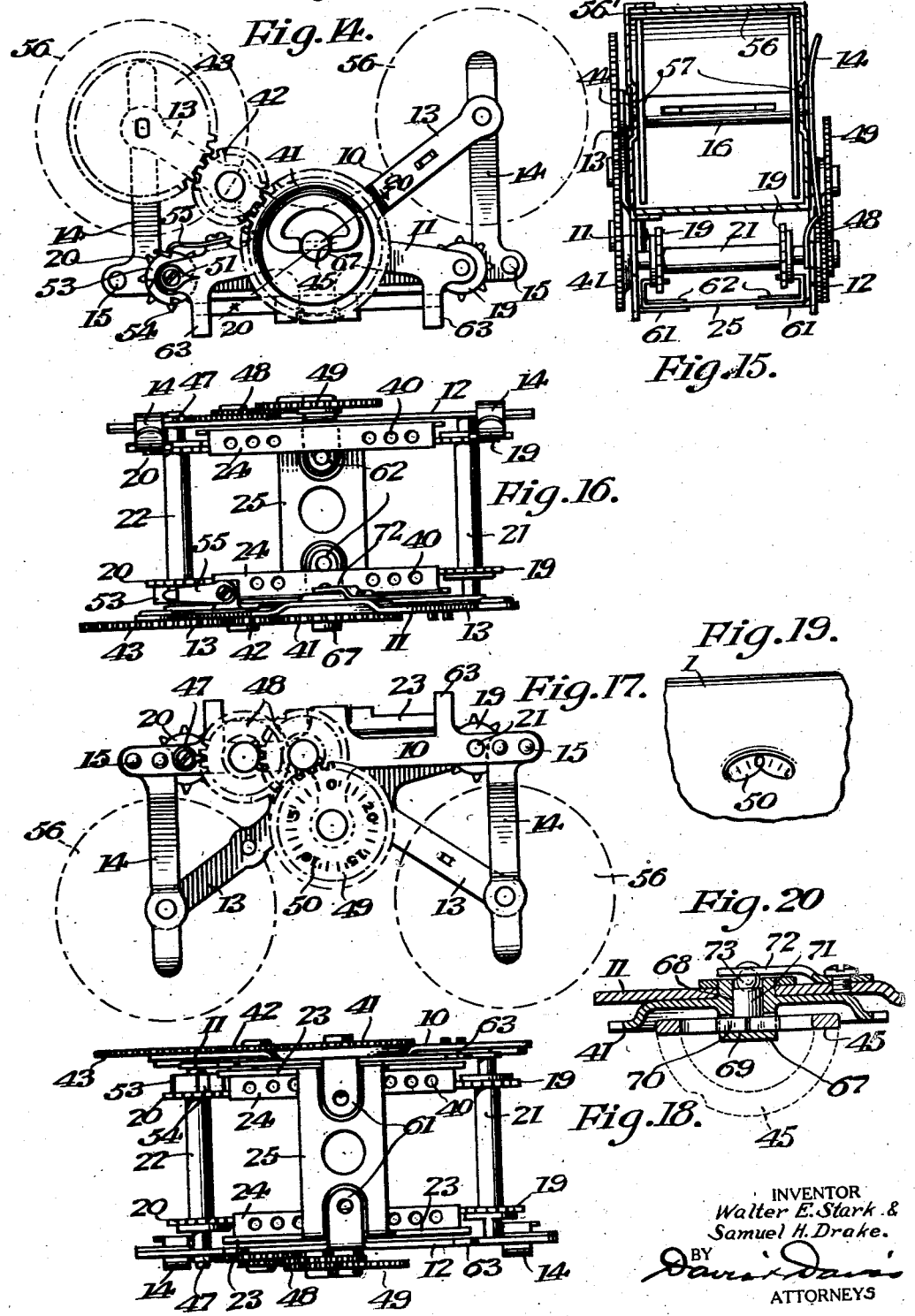

Patented Aug. 14, 1928.

1,680,647

UNITED STATES PATENT OFFICE.

WALTER E. STARK, OF NEW YORK, AND SAMUEL H. DRAKE, OF GROTON, NEW YORK.

CAMERA.

Application filed September 18, 1924, Serial No. 738,447. Renewed November 4, 1927.

This invention relates to cameras and has for an object the provision of a camera adapted to take "exposures" for "still" pictures upon motion-picture film and having means operable exteriorly thereof for varying the size of said exposures. Means are also provided in the camera to indicate the extent of film feed that is required after an exposure of a given size. This is in order to ensure the complete removal of the exposed portion of the film from the adjusted exposure aperture of the camera before another exposure is taken, and also to avoid a waste of the film due to moving it farther past the exposure aperture than is necessary.

A further object of the invention is to provide a pocket camera of improved construction which will be inexpensive to manufacture.

In the drawings, Fig. 1 is a perspective view of our improved camera, looking toward the front thereof;

Fig. 2 a similar view looking toward the rear;

Fig. 3 a sectional plan view on the line 3—3 of Fig. 10;

Fig. 4 a view similar to Fig. 3 with parts removed;

Fig. 5 a transverse section taken on the line 5—5 of Fig. 3;

Fig. 6 a longitudinal section taken on the line 6—6 of Fig. 3;

Fig. 7 a perspective view of details of the film feed and indicating mechanism;

Fig. 8 a plan view of the mechanism for varying the size of the exposure aperture inverted;

Fig. 9 a group view of details of said exposure-varying mechanism;

Fig. 10 a section taken on the line 10—10 of Fig. 2;

Fig. 11 a section taken on the line 11—11 of Fig. 10;

Fig. 12 a detail section of one of the film spool drums;

Fig. 13 a transverse section taken on the line 13—13 of Fig. 6;

Fig. 14 a side elevation of part of the camera structure removed as a unit from the camera casing;

Fig. 15 an end view thereof partly in section;

Fig. 16 a plan view thereof;

Fig. 17 a view of the opposite side of said unitary structure;

Fig. 18 an inverted plan view thereof;

Fig. 19 a view of a portion of one side of the camera, showing the means indicating the total length of film that has been exposed, and Fig. 20, a detail section on the line 20—20 of Fig. 14.

Referring to the parts by numerals, 1 designates the camera casing which is flat, substantially rectangular and preferably of a size to be received within a pocket. The casing is preferably made of sheet metal and is formed in halves or sections 2 and 3 that are separable on a vertical transverse plane. The rear section 3 of the casing has a flange 4 extending around its edge and said flange telescopes within the meeting edge of the front section 2 of the casing and thus makes a light-tight joint between the two sections. The front section 2 carries within one side a small, inwardly projecting stud 5 adapted to engage in an aperture in the flange 4, and the rear section 3 of the casing carries within its opposite side a leaf spring 6 carrying an outwardly projecting stud 7 at its free end. The stud 7 has a tapered end that is adapted to be cammed back and to be projected by the spring through registering openings in the flange 4 and the overlapping portion of the front section of the casing. This provides a yieldable snap fastening for holding the halves of the casing together.

The front half 2 of the casing is centrally formed with a counter-sunk portion 8 in which the lens and shutter structure 9 is mounted. Mounted back of the lens, upon the rear wall of the casing, is a frame 10 which forms a support for several mechanisms to be presently described. The frame 10 includes the two spaced side members 11 and 12. The frame member 11 is formed with two rigid arms 13 and the member 12 has two spring arms 14 secured thereto as at 15. The arms 13 and 14 extend inwardly away from the rear wall of the casing and have pivoted therebetween the film spools 16 and 17 spaced at opposite sides of the lens. The spool 16 carries the unexposed film and the spool 17 is adapted to have the film wound thereon after its exposure.

The film 18 used in the camera is the ordinary motion-picture film and the said film in its passage from spool 16 to spool 17 is trained around two pairs of sprocket wheels 19 and 20 carried by shafts 21 and 22, respectively. The shafts 21 and 22 are pivoted in the opposite side members of the frame 10 and are equally spaced from the rear wall of the camera casing. The stretch of film extending between the two pairs of sprockets passes between a pair of guide strips 23. The strips 23 extend along the opposite side edges of the film and are inturned as at 24 to overlap the marginal edges of the film, as shown in Fig. 3. The guide strips 23 are integrally formed upon the ends of a transverse bridge strip 25 which extends across the film at the opposite face thereof from the inturned flanges 24. Interposed between the flanges 24 and the bridge 25 is a flat guide or presser plate 26 that is yieldingly pressed toward the flanges 24 by a pair of bowed leaf springs 27 extending along the inner sides of the guides 23 and interposed between the presser plate 26 and the bridge 25. The presser plate holds the marginal edges of the film against the under side of the flanges 24. In order to hold the springs 27 in place, each spring is suitably connected at one end and at a point intermediate its ends, to the plate 26 and the bridge 25 respectively.

A pair of longitudinally adjustable light-excluding shields 28 are provided between the lens and the film to vary the size of the exposure aperture of the camera. These shields are in the form of flat sheet metal plates that extend between and are guided by the inturned edges of the flanges 24. Each shield plate 28 carries a toothed rack 29. Each rack 29 is integrally formed upon a transverse sheet metal strip 30 which extends across the opposite face of the film from the shield plates 28. The strips 30 are formed at their ends to extend around the guide strips 23 and their flanges 24 and are secured to the shield plates upon the opposite side of the film by means of screws 31. The racks 29 extend longitudinally of the film, are spaced apart and opposed to each other, and engage the opposite sides of a pinion 32. The pinion extends through a clearance opening in the bridge 25 and is removably secured to the inner end of a shaft 33 which extends outwardly through an opening in the rear wall of the camera casing and has secured thereto an operating knob in the form of a star wheel 34 which is seated in a depression 35 formed in the camera casing. When the star wheel 34 is turned the shield plates 28 will be moved toward or from each other through the medium of the gear 32 and racks 29. The exposure aperture, as shown in Fig. 3, is defined by the edges of the flanges 24 and the opposed edges of the shield plates 28. The center of the exposure aperture is in line with the center of the lens, and when the star wheel 34 is turned the shield plates will be moved in unison equal distances from the center of the aperture.

In order to hold the shield plates accurately in their adjusted positions and to prevent the operating wheel 34 from being turned too easily, as by accident, yieldable, snap, locking means are provided. A leaf spring 36 extends transversely of each shield plate 28 and is secured by means of the screws 31 to the inturned ends 37 of the strips 30. Each of the ends 37 of the strips 30 has an aperture 38 in which is located a ball 39. The free ends of the springs 36 overlie and bear against the balls 39 to snap them into engagement with longitudinally spaced apertures 40 in the guide flanges 24 located in the path of said balls as the shields are moved along the guides. The outer edges of the shield plates and of the presser plates 26 are flared away from the film so as to not impede the movement of the film or the movement of the shield plates over the film.

A gear 41 is pivoted upon the frame member 11 and is adapted to drive an idle gear 42 and a follower gear 43. The gear 43 has a hub 44 which is pivotally held to one of the arms 13 of the frame and has a squared opening adapted to receive one of the trunnions of the film spool 17 and key it to the gear. The drive gear 41 has a hub which extends outwardly through an opening in one side of the casing, and an operating handle 45 is connected thereto. The handle 45 is adapted to be folded down within a depression 46 in the casing. When the handle is turned clockwise the gearing will rotate the spool 17 to wind the film thereon and feed it over the sprockets, through the guiding means, and past the exposure aperture.

The sprocket shaft 22 has a single-tooth gear 47 secured thereto. The gear 47, through a suitable gear train 48, rotates an indicating gear 49 upon the face of which are numbered graduations 50 which are visible in succession through an opening in the camera casing as shown in Fig. 19. This mechanism is adapted to indicate the total length of film that has been fed through the camera.

Removably mounted upon the opposite end of the shaft 22 from the gear 47, outwardly of the camera casing, is an indicating hand 51 which rotates in a depression 52 in the side of the casing as the shaft 2 rotates. One of the sprockets 20 in the shaf 22 is formed with a hub 53 having a series o spaced notches 54 therein adapted to be engaged by a spring detent 55 mounted upon the frame member 11. As the film is fed over the sprocket after each exposure, causing the sprocket to rotate, the detent 55 will click audibly in the notches, and the number of said clicks will indicate the extent of the film feed. In the depression 52 in the casing there is a series of numbered graduations corresponding to the number of notches in the sprocket hub. The hand 51 travels over these graduations when the film is fed. The film feed is thus indicated both visually and audibly.

The star wheel 34 for adjusting the size of the exposure aperture carries a pointer $34^1$ which moves over a series of numbered graduations in the bottom of the depression 35 in the casing and indicates the size of the aperture. The pointer $34^1$ and the indicating hand 51 cooperate in indicating the proper film feed after an exposure of a given size. After an exposure the operator first observes the position of the pointer $34^1$ and then turns the feed operating handle 45 clockwise until the position of the indicating hand 51 or the number of audible clicks indicates that the film has been fed sufficiently to remove the exposure from the exposure aperture of the size indicated. This enables the operator to avoid both overlapping exposures and waste of film. As shown in Fig. 2 of the drawings, the pointer $34^1$ is directed toward the number "4" and it will therefore be necessary, after an exposure, to turn the handle 45 until the indicating hand 51 passes over four graduations or until four clicks are heard.

The film spools are enclosed in light-excluding drums 56. The trunnions of the spools extend outwardly through the ends of the drums and the drums are mounted as at 57 to permit them to rotate on the trunnions. The film passes into the drums through a slit which is faced as at 58 with felt or other suitable expansible material. The rotatable mounting of the drums permits them to turn and change the location of the film slits therein according to the varying diameters of the film rolls, as shown in Fig. 10, and thus ensure a direct pull upon the film during the feed thereof. To prevent the drum which encloses the spool 17 from turning with the spool and winding the film about the outside of said drum in case the film should bind in the entrance slit of the drum, the drum is provided with a projection 59 which is adapted to strike a stop 60 projecting inwardly from the casing. Each of the drums is formed with a removable end $56^1$ which provides for the insertion of the spools therein. In order to mount the drums in the frame 10 the spring arms 14 are spread away from the rigid arms 13 to permit the outwardly projecting spool trunnions to be inserted in their bearings.

The opposite side members 11 and 12 of the frame 10 are formed with inturned ears 61 which are secured to ears 62 formed in the bridge strip 25. Screws 63 are passed through the bottom of the casing depression 35 and through both of said ears 61 and 62 to hold the frame and its connected parts in place within the casing, as shown in Fig. 13. The depressed portion 35 of the frame abuts the bridge 25 and the frame 10 is formed with feet 63 which rest upon the rear wall of the casing to properly position the frame. It will be seen that the frame and the mechanisms mounted thereon are insertable and removable from the camera casing as a unit. This unitary structure is illustrated in Figs. 14 to 18 of the drawings. In these views certain parts, such as the shield plates 28 and the presser plate 26, have been left out in order to simplify the illustration.

A series of finders 64 are mounted upon one side of the camera casing and have a common hinge connection 65 thereto which adapts them to be folded down within a depression 66 in the casing. These finders have apertures of different sizes to correspond with the different exposure aperture adjustments. As shown in Fig. 2 of the drawing, the pointer $34^1$ is in position to indicate the largest exposure aperture and the finder having the largest aperture is consequently swung out to operative position.

The hub 67 of the gear 41 is pivotally mounted at its inner end upon the frame member 11 as shown in Fig. 20. An axial bore 68 extends from the pivoted end of the hub toward the outer end thereof and is intersected by a transverse passage 69 adjacent the outer end. The handle 45 is in the form of a bail or loop having opposed ends 70 which are pivoted in the transverse passage 69. The ends 70 are square in cross section. A plug 71 is slidably mounted in the axial bore 68 and has its outer end forced into contact with the squared ends 70 of the handle by a leaf spring 72 secured to the inner side of the frame member 11. A ball 73 is interposed between the free end of the spring and the end of the plug 71 and the spring exerts its pressure upon the plug through said ball. This provides a yieldable snap fastening means for holding the handle in either folded or extended position. In either position of the handle the spring presses the plug 71 upon one of the flat sides of the squared ends 70 and resists a movement of the handle to the other position. The handle 45 is so located and proportioned that when swung out to its extended position its outer edge will be in line with the center of the finder aperture and will serve as a sight in taking an observation through the finder. If the handle does not happen to be in the proper angular position to take an observation, it may be turned counter-clockwise to properly aline it with the finder. This counter-clockwise turn will not disturb the film at the exposure aperture but will merely cause a slack between the spool 17 and the sprocket 20. The handle 45 is adapted to be detached by expanding it to disengage its inturned ends from the hub 67, in order to permit the mechanism within the casing to be removed.

The camera structure is almost entirely of sheet metal and is so designed as to provide a pocket camera of extremely compact form notwithstanding the inclusion of the additional features described.

What we claim is:

1. In a camera adapted to use film, a pair of light-excluding shield plates overlying the face of the film directed toward the camera lens, means operable exteriorly of the camera to move said plates toward or from each other to vary the size of the exposure aperture therebetween, and automatic yieldable locking means interposed between a fixed part and a part movable with the shield plates to hold the shield plates in their adjusted positions.

2. In a camera adapted to use film, a pair of light-excluding shield plates overlying the face of the film directed toward the camera lens, means operable exteriorly of the camera to move said plates edgewise toward or from each other to vary the size of the exposure aperture therebetween, a plate adapted to engage the opposite side of the film and yieldingly press the film toward the shield plates, and automatic yieldable locking means interposed between a fixed part and a part movable with the shield plates adapted to hold the shield plates in an adjusted position.

3. In a camera adapted to use film, a pair of light-excluding shield plates overlying the face of the film directed toward the camera lens, means operable exteriorly of the camera to adjust said plates edgewise toward or from each other to vary the size of the exposure aperture therebetween, means to guide the movements of the shields and the film, and automatic yieldable locking means between the shields and the said guiding means adapted to hold the shield plates in their adjusted positions.

4. In a camera adapted to use film, a pair of light-excluding shield plates between the film and the camera lens, means operable exteriorly of the camera to adjust said plates in unison edgewise toward or from each other equal distances to either side of a center line through the lens, means to guide the movements of the shield plates and the film, and automatic yieldable locking means between the shield plates and the said guiding means adapted to hold said plates in an adjusted position.

5. In a camera adapted to use film, a pair of light-excluding shield plates overlying the face of the film directed toward the camera lens, a rack carried by each shield plate at the opposite face of the film, a gear engaging both of said racks, an operating member outside of the camera casing connected to said gear, guiding means for the shield plates whereby when the said operating member is rotated the said plates are moved edgewise equal distances in unison toward or from each other in the same plane to vary the size of the exposure aperture therebetween, and means to indicate the adjusted size of the exposure aperture.

6. In a camera adapted to use film, a pair of light-excluding shield plates overlying the face of the film directed toward the lens, a rack carried by each shield plate and extending at the opposite face of the film, a gear engaging both of said racks, an operating member exteriorly of the camera casing connected to said gear, guiding means for the shield plates, whereby when the said operating member is rotated the said plates are moved edgewise equal distances in unison toward or from each other in the same plane to vary the size of the exposure aperture therebetween, means to indicate the adjusted size of the exposure aperture, and automatic snap locking means between the shield plates and their said guiding means adapted to yieldingly hold said plates in their adjusted positions.

7. In a camera adapted to use film, a pair of light-excluding shield plates overlying the face of the film directed toward the lens, a film guide and presser plate adapted to engage the opposite face of the film and yieldingly press the film toward the shield plates, a rack carried by each shield and extending over the outer face of said presser plate at the opposite side of the film from the shield plates, a gear engaging both of said racks, an operating member outside of the camera casing connected to said gear, guiding means for the shield plates, whereby when the said operating member is rotated the said plates are moved edgewise equal distances in unison toward or from each other in the same plane to vary the size of the exposure aperture therebetween, and means cooperating with said operating member to indicate the adjusted size of the exposure aperture.

8. A camera adapted to use film, comprising a pair of side frames, a pair of longitudinally extending film guides, means rigidly connecting together the film guides, means connecting the side frames to the film guides, means for detachably securing the guides and the frames within a camera casing, a pair of light-excluding shield plates adapted to overlie the side of the film directed toward the lens and movable in said guides, a film guide and presser plate adapted to engage the opposite face of the film and yieldingly press the film into engagement with the shield plates, means for adjusting the shields toward and from each other, forwardly extending spool-supporting arms carried by one of said frames and adapted to receive the journals of the film spools, forwardly extending spring arms carried by the opposite side frame and adapted to engage the journals of the film spools, a pair of freely oscillating light-excluding drums adapted to surround the film spools and to automatically adjust themselves to the varying positions of the film entering and leaving said drums, a film-winding gearing mounted on one of said side frames and adapted to be connected to the film take-up spool, operating means exteriorly of the camera casing and connected to the film take-up gearing carried by the said side frame, a pair of film-guiding sprocket wheels at each end of the film guides and over which the film runs from the let-off spool to the take-up spool, a film-feed-indicating gearing mounted on one of the said side frames opposite the film take-up gearing, means whereby one of the said sprocket wheels will operate the indicating gearing, and means exteriorly of the camera casing and connected to said indicating gearing to indicate the length of film drawn through the film guides.

9. A camera adapted to use film, comprising a pair of side frames, a pair of longitudinally extending film guides, means rigidly connecting together the film guides, means connecting the side frames to the film guides, means for detachably securing the guides and the frames within a camera casing, a pair of light-excluding shield plates adapted to overlie the side of the film directed toward the lens and movable in said guides, a film guide and presser plate adapted to engage the opposite face of the film and yieldingly press the film into engagement with the shield plates, a pair of racks at the rear side of the shield plates, means for rigidly connecting one of said racks to each of the shield plates, a gear engaging both of said racks, detachable means connected to said gear and extending without the camera casing for rotating said gear, means carried by the film guides to automatically and yieldingly lock the shield plates in a plurality of adjusted positions, forwardly extending spool-supporting arms carried by one of said frames and adapted to receive the journals of the film spools, forwardly extending spring arms carried by the opposite side frame and adapted to engage the journals of the film spools, a pair of freely oscillating light-excluding drums adapted to surround the film spools and to automatically adjust themselves to the varying positions of the film entering and leaving said drums, a film-winding gearing mounted on one of said side frames and adapted to be connected to the film take-up spool, operating means exteriorly of the camera casing and adapted to be detachably connected to the film take-up gearing carried by the said side frame, a pair of film-guiding sprocket wheels at each end of the film guides and over which the film runs from the let-off spool to the take-up spool, a film-feed-indicating gearing mounted on one of the said side frames opposite the film take-up gearing, means whereby one of the said sprocket wheels will operate the indicating gearing, and means exteriorly of the camera and adapted to be detachably connected to said indicating gearing to indicate the length of film drawn through the film guides.

10. A camera adapted to use film, comprising a camera casing, a pair of side frames, a pair of longitudinally extending film guides, means rigidly connecting together the film guides, means connecting the side frames to the film guides, means for detachably securing the guides and the frames within the camera casing, a light-excluding shield device adapted to overlie the side of the film directed toward the lens, a film guide and presser plate adapted to engage the opposite face of the film and yieldingly press the film into engagement with the shield device, spool-supporting arms carried by one of said frames and adapted to receive the journals of the film spools, arms carried by the opposite side frame and adapted to engage the journals of the film spools, a pair of light-excluding drums adapted to surround the film spools, a film-winding gearing mounted on one of said side frames, and adapted to be connected to the film take-up spool, operating means exteriorly of the camera casing and connected to the film take-up gearing carried by the said side frame, a pair of film-guiding sprocket wheels at each end of the film guides and over which the film runs from the let-off spool to the take-up spool, a film-feed-indicating gearing mounted on one of the said side frames, means whereby one of the said sprocket wheels will operate the indicating gearing, and means visible exteriorly of the camera casing and connected to said indicating gearing to indicate the length of film drawn through the film guides.

11. A camera adapted to use film, comprising a camera casing, a pair of side frames; a pair of longitudinally extending film guides; means connecting the side frames to the film guides; means for detachably securing the guides and the frames within the camera casing; a light-excluding shield device adapted to overlie the side of the film directed toward the lens; a film guide and presser plate adapted to engage the opposite face of the film and yieldingly press the film into engagement with the shield device; spool-supporting arms carried by one of said frames and adapted to receive the journals of the film spools; supports carried by the opposite side frame and adapted to engage the journals of the film spools; a film-winding gearing mounted on one of said side frames and adapted to be connected to the film take-up spool; operating means exteriorly of the camera casing and connected to the film-winding gearing carried by the said side frame; a pair of film-guiding take-up sprocket wheels at one end of the film guides and over which the film runs from the let-off spool to the take-up spool; a film-feed-indicating gearing mounted on one of the said side frames to indicate the total length of film on the take-up spool; means whereby one of the said sprocket wheels will operate the indicating gearing; means visible exteriorly of the camera casing to indicate the length of film drawn through the film guides for a single exposure; and means connecting the single-exposure indicating means to the take-up sprocket wheels.

12. A camera adapted to use film, comprising a camera casing; a frame; film guides; means for securing the guides and the frame within the camera casing; means for defining the area of film subjected to light during an exposure; spool-supporting arms carried by said frame and adapted to receive the journals of the film spools; spring supports carried by the opposite side of the frame from the said arms and adapted to engage the journals of the film spools; a pair of freely oscillating light-excluding drums adapted to surround the film spools and to automatically adjust themselves to the varying positions of the film entering and leaving said drums; a film-winding gearing mounted on one side of said frame and adapted to be connected to the film take-up spool; operating means exteriorly of the camera casing and connected to the film-winding gearing carried by the frame; a pair of film-guiding take-up sprocket wheels at one end of the film guides and over which the film runs from the let-off spool to the take-up spool; a film-feed-indicating gearing mounted on the said frame to indicate the total length of film on the take-up spool; means whereby one of the said sprocket wheels will operate the indicating gearing; means visible exteriorly of the camera casing to indicate the length of film drawn through the film guides for a single exposure; and means connecting the single-exposure indicating means to the take-up sprocket wheels.

13. A camera adapted to use film, comprising a camera casing; a pair of side frames; a pair of longitudinally extending film guides; means connecting the side frames to the film guides; means for detachably securing the guides and the frames within the camera casing; a light-excluding shield device adapted to overlie the side of the film directed toward the lens; a film guide and presser plate adapted to engage the opposite face of the film and yieldingly press the film into engagement with the shield device; spool-supporting arms carried by one of said frames and adapted to receive the journals of the film spools; supports carried by the opposite side frame and adapted to engage the journals of the film spools; a pair of light-excluding drums adapted to surround the film spools; a film-winding gearing mounted on one of said side frames and adapted to be connected to the film-take-up spool; operating means exteriorly of the spool; operating means exteriorly of the camera casing and connected to the film-winding gearing carried by the said side frame; a pair of film-guiding take-up sprocket wheels at one end of the film guides and over which the film runs from the let-off spool to the take-up spool; means to indicate the total length of film on the take-up spool.

14. A camera adapted to use film, comprising a frame; a pair of longitudinally extending film guides; means for securing the guides and the frame within a camera casing; adjustable means for varying the area of film subjected to light during an exposure; means for yieldingly holding the film against the said adjustable means; spool-supporting arms carried by said frame and adapted to receive the journals of the film spools; spring supports carried by the opposite side of the frame from the said arms and adapted to engage the journals of the film spools; a film-winding gearing mounted on one side of said frame and adapted to be connected to the film-take-up spool; operating means exteriorly of the spool; operating means exteriorly of the camera casing and connected to the film-winding gearing carried by the frame; a pair of film-guiding take-up sprocket wheels at one end of the film guides and over which the film runs from the let-off spool to the take-up spool; a film-feed-indicating gearing mounted on said frame to indicate the total length of the film on the take-up spool; means whereby one of the said sprocket wheels will operate the indicating gearing; means exteriorly of the camera casing to indicate the length of film drawn through the film guides for a single exposure; and means connecting the single-exposure indicating means to one of the take-up sprockets.

15. A camera adapted to use film, comprising a camera casing; adjustable means for varying the area of film subjected to light during an exposure; spool-supporting means carried by said casing and adapted to receive the journals of the film spools; a film-winding gearing within the casing and adapted to be connected to the film-take-up spool; operating means exteriorly of the camera casing and connected to the film-winding gearing; a pair of film-guiding take-up sprocket wheels over which the film runs from the let-off spool to the take-up spool; a film-feed-indicating gearing mounted within the casing to indicate the total length of the film on the take-up spool; means whereby one of the said sprocket wheels will operate the indicating gearing; means exteriorly of the camera casing to indicate the length of film drawn from the let-off spool for a single exposure; and means connecting the single-exposure-indicating means to one of the take-up sprockets.

16. A camera adapted to use film, comprising a camera casing; a frame; film guides; means for securing the guides and the frame within the camera casing; means for defining the area of film subjected to light during an exposure; spool-supporting arms carried by said frame and adapted to receive the journals of the film spools; supports carried by the opposite side of the frame from the said arms and adapted to engage the journals of the film spools; a pair of freely oscillating light-excluding drums adapted to surround the film spools and to automatically adjust themselves to the varying positions of the film entering and leaving said drums; a film-winding operating means exteriorly of the camera casing and operatively connected to the film take-up spool; a pair of film-guiding take-up sprocket wheels at one end of the film guides and over which the film runs from the let-off spool to the take-up spool; a film-feed-indicating gearing mounted on the said frame to indicate the total length of film on the take-up spool; means whereby one of the said sprocket wheels will operate the indicating gearing; means visible exteriorly of the camera casing to indicate the length of film drawn through the film guides for a single exposure; and means connecting the single-exposure indicating means to the take-up sprocket wheels.

In testimony whereof we hereunto affix our signatures.

WALTER E. STARK.
SAMUEL H. DRAKE.